United States Patent [19]

Marks

[11] Patent Number: 5,724,700
[45] Date of Patent: Mar. 10, 1998

[54] LOW PROFILE, FLAT SPRING WINDSHIELD WIPER ASSEMBLY

[75] Inventor: Joel Steven Marks, Los Angeles, Calif.

[73] Assignee: WorkTools, Inc., Chatsworth, Calif.

[21] Appl. No.: 331,705

[22] Filed: Oct. 31, 1994

[51] Int. Cl.$^6$ .................. B60S 1/28; B60S 1/38
[52] U.S. Cl. .................. 15/250.41; 15/250.48; 15/250.451; 15/250.44; 15/250.46; 15/250.43
[58] Field of Search .......... 15/250.44, 250.451, 15/250.452, 250.453, 250.454, 250.46, 250.47, 250.48, 250.43, 250.41, 250.361, 250.37, 250.38, 250.39, 250.4

[56] References Cited

U.S. PATENT DOCUMENTS

| | | | |
|---|---|---|---|
| 1,953,703 | 4/1934 | Dirienzo | 15/250.44 |
| 2,589,339 | 3/1952 | Carson | 15/250.43 |
| 2,920,335 | 1/1960 | Ryck | 15/250.48 |
| 3,104,412 | 9/1963 | Hinder | 15/250.43 |
| 3,176,337 | 4/1965 | Glynn | 15/250.44 |
| 3,192,551 | 7/1965 | Appel | 15/250.43 |
| 3,545,028 | 12/1970 | Poland | 15/250.48 |
| 3,566,432 | 3/1971 | Quinlan et al. | 15/250.48 |
| 3,978,543 | 9/1976 | Tomlin | 15/250.44 |
| 4,028,770 | 6/1977 | Appel | 15/250.453 |
| 4,309,790 | 1/1982 | Bauer et al. | 15/250.44 |
| 4,473,919 | 10/1984 | Fritz, Jr. | 15/250.48 |
| 4,490,880 | 1/1985 | Thompson | 15/250.43 |
| 4,592,110 | 6/1986 | Verton | 15/250.44 |
| 5,150,498 | 9/1992 | Charng | 15/250.451 |
| 5,172,449 | 12/1992 | Baumgarten et al. | 15/250.47 |
| 5,423,105 | 6/1995 | Scott | 15/250.4 |

FOREIGN PATENT DOCUMENTS

| | | | |
|---|---|---|---|
| 1033521 | 4/1953 | France | 15/250.44 |
| 1060421 | 4/1954 | France | 15/250.44 |
| 2482540 | 11/1981 | France | 15/250.43 |
| 2563481 | 10/1985 | France | 15/250.47 |
| 2114102 | 4/1972 | Germany | 15/250.451 |
| 2353368 | 5/1975 | Germany | 15/250.453 |
| 3527528 | 2/1987 | Germany | 15/250.452 |
| 655541 | 7/1963 | Italy | 15/250.46 |
| 56-138048 | 10/1981 | Japan | 15/250.453 |
| 1078066 | 8/1967 | United Kingdom | 15/250.44 |
| 1395918 | 5/1975 | United Kingdom | 15/250.43 |
| 2212055 | 7/1989 | United Kingdom | 15/250.43 |
| WO 83/02756 | 8/1983 | WIPO . | |

*Primary Examiner*—Gary K. Graham
*Attorney, Agent, or Firm*—Paul Y. Feng; Fulwider Patton Lee & Utecht

[57] ABSTRACT

A low profile, flexible windshield wiper assembly has a frame constructed from flat sheet spring steel. The frame attaches to a semi-rigid spline at distinct pressure points, while the spline supports a rubber wiping blade. At least some of the pressure points are located at the end of cantilevered fingers formed in the frame so that the spline may flex independently from the frame. The cantilevered fingers allow semi-pivotable portions of the frame to flex independently from the rest of the frame to enhance curve conformance on a windshield. The frame attaches along the center of the spline while the blade attaches along the edges of the spline. The present invention allows the pressure points to be efficiently formed out of the frame material.

16 Claims, 4 Drawing Sheets

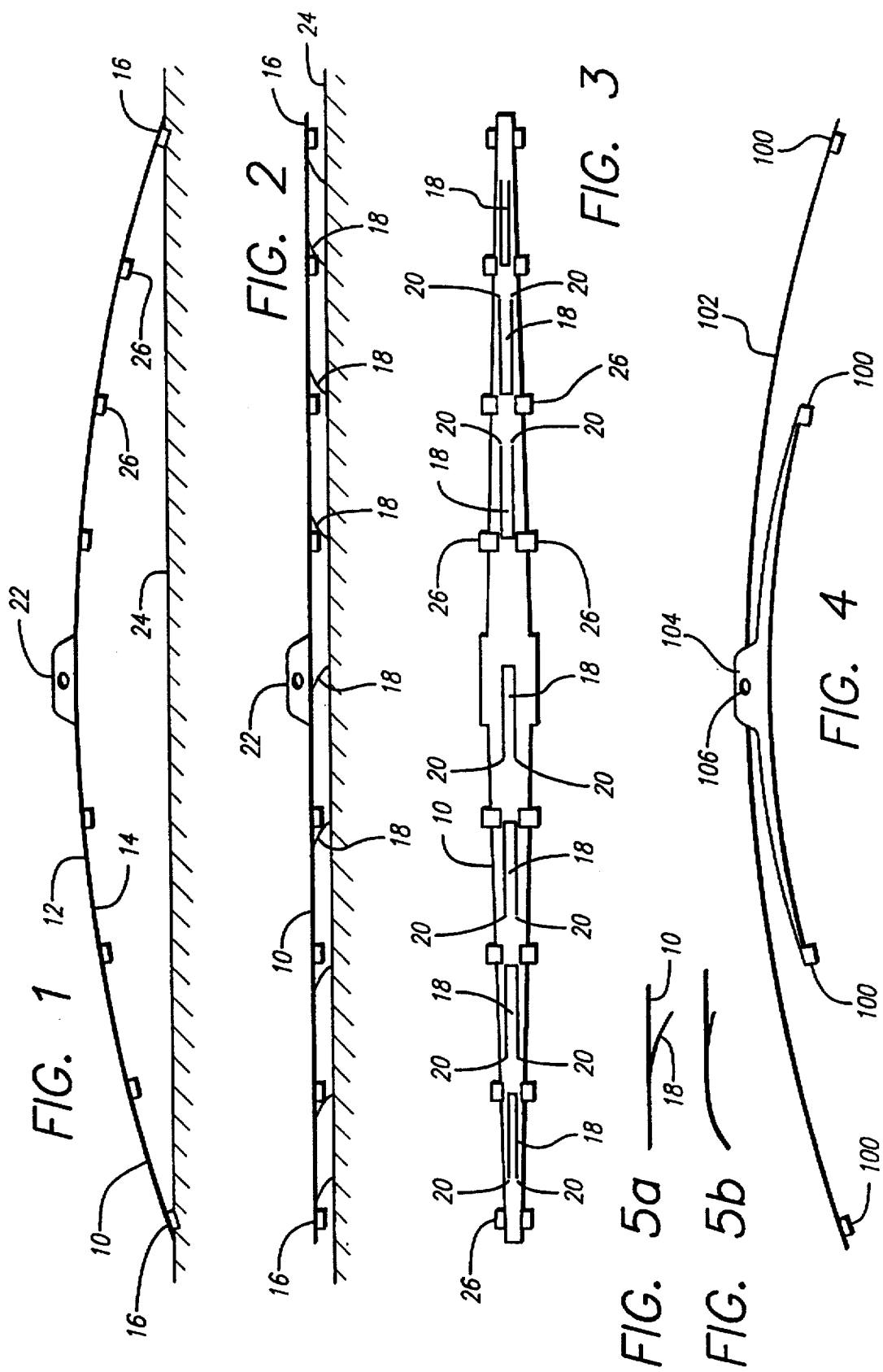

LOW PROFILE, FLAT SPRING WINDSHIELD WIPER ASSEMBLY

BACKGROUND OF THE INVENTION

1. Field of the Invention

The present invention generally relates to windshield wipers. More precisely, the present invention relates to a low profile wiper assembly having blade support structures formed from spring materials.

2. Related Art and Other Information

There have been efforts to simplify the structure of a conventional windshield wiper, especially the wiper frame. Most conventional wiper frames have articulated members that pivot and flex along with the flexible, rubber wiper blade to which they are attached. A semi-rigid spline is often used to help attach the blade to the frame.

There have been improvements in which the windshield wiper support structures do not use stiff, articulated members to hold the blade. Such designs are made of substantially one resilient member to which a wiper blade is directly mounted. The resilient member often features a varying cross-section to provide more even pressure distribution.

For example, U.S. Pat. No. 2,589,339 to Carson and U.S. Pat. No. 3,881,213 to Tilli teach holding the blade with multiple, closely spaced angle brackets. The brackets are formed integrally as components of the frame structure. U.S. Pat. No. 3,881,214 to Palu discloses a wiper that uses a continuous channel within the resilient frame to hold the blade. Unfortunately, Palu does not disclose a method to manufacture this channel.

U.S. Pat. No. 2,613,385 to Wylie, U.S. Pat. No. 3,387,316 to Pearse, and U.S. Pat. No. 3,480,986 to Forster generally disclose wiper frames that enclose the resilient member in a sheath with the wiping edge being part of, or attached to, the sheath. These three designs must all use the arm directly as the blade support, without a separately articulated frame member.

U.S. Pat. No. 3,192,551 Appel proposes adhesive bonding the blade to the resilient member. Pearse also suggests bonding as an option. Appel further suggests an elongated slot opening within the resilient member into which the blade can be installed. Such a slot will greatly reduce the stiffness of the frame in twisting. U.S. Pat. No. 3,969,784 to Journee mounts a conventional spline supported blade to a resilient secondary bridge member.

Carson, Wylie, Appel, Pearse and Forster use spring steel to form a blade support of varying cross-section. Wylie uses a multi-piece stacked leaf spring. Tilli and Palu form the resilient member from plastic. Journee combines a primary bridge member with pivotally mounted secondary bridge members where the main member is rigid and the secondary ones are resilient.

Wylie and Pearse show a contacting member at the distal end of the resilient arm. The member controls the position of the tip of the arm.

Unfortunately, the foregoing conventional wiper frames are highly complex, and are therefore difficult if not impossible to manufacture. Because of their complex structure, they often have very high profiles. In order to lower the profile of the wiper, some have developed intricate frames with a network of parallel channels as shown in, for example, U.S. Pat. No. 5,190,801 to Charet et al.; U.S. Pat. No. 5,150,498 to Charng; or U.S. Pat. No. 4,317,251 to Priesemuth. These wiper frames still have relatively high profiles.

SUMMARY OF THE INVENTION

In view of the foregoing, the present invention is directed to a low profile windshield wiper assembly that incorporates a single, flat spring frame. The frame is pivotally mounted near its center to a motor-driven wiper actuation arm. The flexible frame structure attaches at distinct pressure points to a semi-rigid spline. The spline in turn supports a rubber blade.

In a preferred embodiment, the pressure points are located at the ends of resilient cantilevered fingers. The cantilevered fingers extend from the frame into openings formed within the flat spring frame such that the pressure points are suspended from the tip of the cantilevered fingers, which fingers pivot against the frame in a manner that provides "local resiliency" to the spline. The curve conformance to a windshield of an automobile of the present invention thereby exceeds that of prior art resilient frames since the frame and cantilevered fingers are independently deformable. The present invention thus combines the well proven pressure-point-to-spline mounting with a fully resilient frame.

To further enhance the curve conformance of the frame to a windshield, the cantilevered fingers are oriented in a reverse direction so that the fingers point inward. In this orientation, the distal, pressure point end of each cantilevered finger points toward the center of the length of the frame.

The cantilevered fingers within the frame effectively create pivotally-mounted segments. That is, pressing one cantilevered finger causes an opposite reaction on an outward portion of the frame and vice versa. The reversed cantilevered fingers thus give more constant pressure along the blade than is possible with prior art resilient frames, or which would be possible with outward pointing cantilevered fingers.

In a preferred embodiment, the cantilevered fingers are cut integrally with the body of the frame. The pressure points then attach centrally along the spline, rather than the conventional standard mount that holds the spline side-by-side. To hold a conventional, standard-type blade, such a spline would need to be double height because the blade also attaches centrally along the spline.

In a preferred embodiment, the present invention provides a dual runner blade. The blade-runners engage the spline within channels along each side of the spline, on either side of a channel for the frame mounting.

Moreover, all channels of the spline are preferably coextensive within the same thickness bounded by two imaginary parallel planes. A single height spline is therefore practical. Naturally, a dual runner blade to fit this spline must necessarily be of suitable design to function well.

There are many benefits to a single height spline. For example, a single height spline is more flexible and slimmer than a double height spline. Also, the low profile construction lowers wind resistance and helps maintain a low coefficient of drag on a vehicle. Furthermore, the low profile construction prevents wiper lift-off at high vehicle speeds in rainy weather.

It is therefore an object of the present invention to provide an efficient mechanism to mount a rubber wiper blade to a single, flat spring frame. A further object of the present invention is to incorporate semi-pivotable cantilevered fingers into the structure of the flexible frame to enhance the windshield curve-following ability of the primary frame structure. It is a further object of the present invention that the frame structure exerts force upon a semi-rigid spline, to which the rubber blade is mounted at distinct pressure points. It is yet a further object of the present invention that the spline is mounted to the frame structure at least partially through cantilevered fingers to allow the spline to bend independently from the frame structure and hence to better follow local contours of a windshield. It is a further object of the present invention that the cantilevered fingers and suspension features are incorporated integrally within the plane of the flat spring primary frame structure. It is another object of the present invention that the cantilevered fingers be formed integrally with the frame and include an out-of-plane bend for attachment of a wiper spline.

BRIEF DESCRIPTION OF THE DRAWINGS

The objects, features and advantages of the present invention will be apparent to one skilled in the art from reading the following detailed description in which:

FIG. 1 is a side elsrational view of an exemplary embodiment of a resilient flat spring wiper frame according to the present invention.

FIG. 2 is a side elevational view of the present invention wiper frame pressed against a surface.

FIG. 3 is a top plan view of the present invention flat spring wiper.

FIG. 4 is an alternative embodiment of the present invention.

FIGS. 5(a) and (b) illustrate the action of the cantilevered fingers.

DETAILED DESCRIPTION OF THE INVENTION

Figure 6:
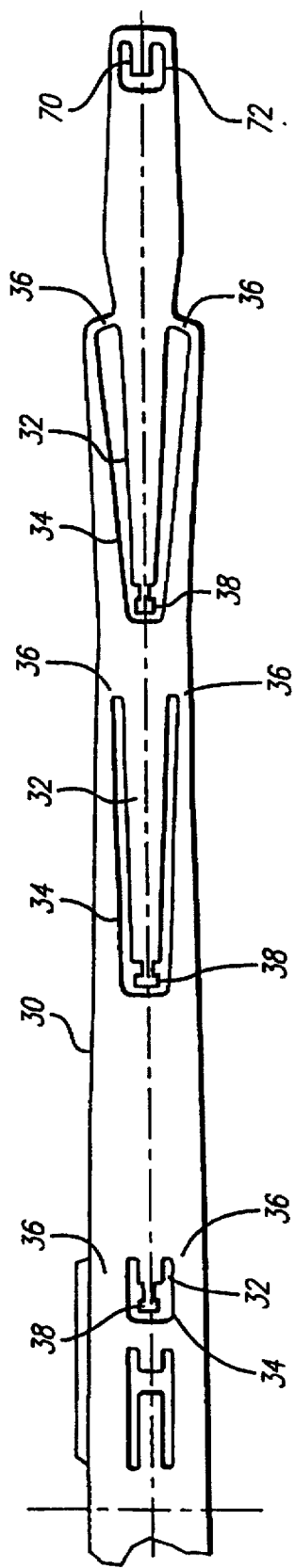
FIGS. 6 and 7 are top plan views of the complementary halves of a preferred embodiment wiper frame.

The following specification describes a flat spring frame, low profile windshield wiper assembly and components thereof. In the description, specific materials and configurations are set forth in order to provide a more complete understanding of the present invention. But it is understood by those skilled in the art that the present invention can be practiced without those specific details. In some instances, well-known elements are not described precisely so as not to obscure the invention.

The present invention is directed to a low profile windshield wiper assembly having components that include a number of innovative features. For example, in a preferred embodiment, the frame is made from a flat, spring metal strip. Within the thin strip are resilient, cantilevered fingers blanked from the flat frame, which fingers are used to mount a semi-rigid spline. The spline is used as an attachment mechanism to hold a wiper blade to the frame. More importantly, the spline in a preferred embodiment has mounting channels positioned side-by-side so that the channels share a common thickness.

Altogether, the present invention provides a very low profile windshield wiper that closely follows the contours of a curved windshield. To be sure, the cantilevered fingers act as a suspension system giving the wiper a level of compliance to follow surface contours. By virtue of the flat spring frame and horizontally nested spline, the wiper assembly bears a very low profile.

FIGS. 1 and 2 are side elsrational views of an exemplary embodiment flat spring wiper frame 10 according to the present invention. FIG. 3 is a top plan view of the flat spring wiper frame 10 shown in FIGS. 1 and 2. As mentioned earlier, the frame 10 is preferably a simple strip of resilient material such as spring steel. Other resilient materials known in the art can be used as well.

As best seen in FIG. 1, the frame 10 has a top side 12 and an underside 14. The frame 10 is preferably formed through known methods such as heat treatment so that it tends to bow or curve toward the underside 14. The degree of curvature in the frame 10 can, of course, be optimized.

The flat spring wiper 10 in FIG. 1 includes a mounting bracket 22. As in a conventional wiper frame, the mounting bracket 22 facilitates attachment of the frame 10 to a wiper actuation arm (not shown) of any vehicle, train, ship, airplane, or the like.

As best seen in the bottom plan view of FIG. 3, each flat spring frame 10 includes cantilevered fingers 18 disposed along the length thereof. The cantilevered fingers 18 are preferably formed by a blanking operation that punches out a partial silhouette of the finger 18 leaving a base where the flat spring frame 10 transitions into the cantilevered finger 18. Although a blanking process is used to form the fingers, other metalworking or forming operations known in the art can be employed to fashion the fingers.

On either side of the base are the hinge areas 20. The hinge areas 20 are where the majority of the localized bending occurs independently of the rest of the frame 10.

To further enhance the curve conformance of the frame 10 to any swept surface, the cantilevered fingers 18 are preferably oriented in a reverse direction so that the fingers 18 point inward. In this orientation, the distal, freely moving pressure point end of each cantilevered finger 18 points toward the center of the length of the frame 10.

As seen in FIG. 2, when the frame 10 is forced against a swept surface 24, the cantilevered fingers 18 bend downward beneath the underside 14 due to internal bending moments. FIGS. 5(a) and 5(b) better illustrate this action. When the frame 10 is flattened, each cantilevered finger 18 is forced away from the flat spring frame 10 and extends toward the space beneath the underside of the frame 10. The cantilevered fingers 18 therefore pivot at the respective hinges 20 giving the frame local resiliency.

Indeed, the cantilevered fingers 18 within the frame 10 create, essentially, pivotally mounted segments. Because the frame 10 is relatively flexible, pressure against one cantilevered finger 18 causes an opposite reaction at another portion of the frame 10 and vice versa. The reversed cantilevered fingers 18 thus give more constant downward pressure along the length of the blade 10. Also, the cantilevered fingers 18 provide discrete pressure points along the length of the frame 10. Therefore, the cantilevered fingers 18 in essence work as a suspension system for the wiper blade attached thereto so that there can be independent, localized flexing as well as overall flexing along the length of the frame 10.

Figure 7:
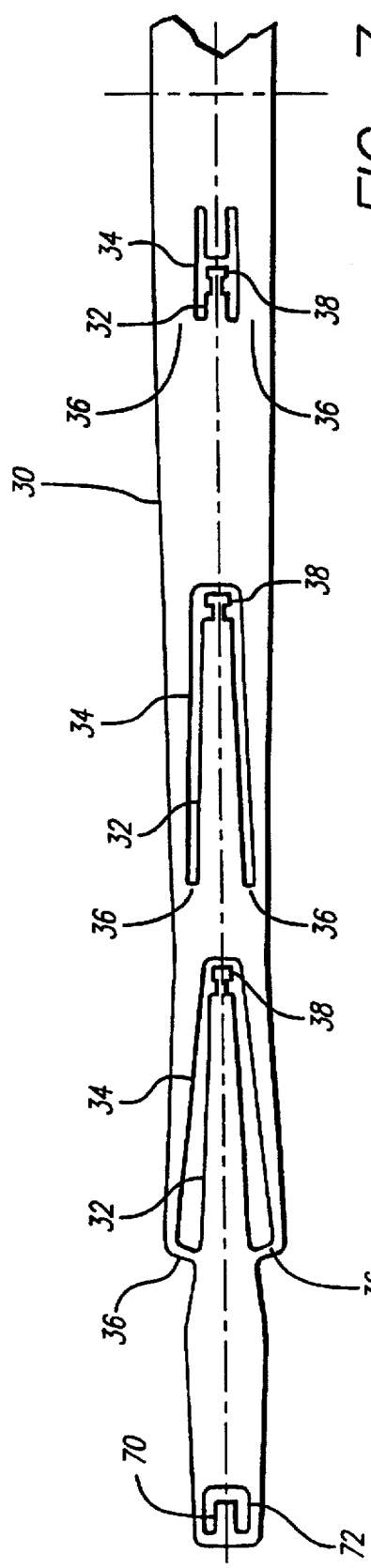

FIGS. 6 and 7 show complementary halves of a preferred embodiment flat spring wiper frame 30. Similar to the embodiment shown in FIGS. 1–3, the preferred embodiment frame 10 is made from a spring steel material. As such, the frame 10 naturally has a very thin and flat cross-sectional shape. On the other hand, the frame can be made to any known cross-sectional shape depending on the specific performance and rigidity requirements. Likewise, the thickness of the frame 30 can also be varied along its length to increase or decrease local rigidity. Again, the flat spring frame 30 is bowed toward its underside.

The mounting bracket of the flat spring wiper frame 30 shown in FIGS. 6 and 7 has been omitted for clarity. Nevertheless, any mounting bracket known in the art that facilitates attachment of the frame to an actuation arm can be used. In the preferred embodiment shown in FIGS. 6 and 7, there are preformed, cantilevered fingers 32 disposed in respective openings 34. The cantilevered fingers 32 are preformed in that they are shaped during a blanking step as the spring steel sheet is punched to form the spring frame 30. As in the preceding exemplary embodiment, the cantilever fingers 32 are integral at its base with the frame 30; the regions on either side of the base function as a hinge 36 for the cantilevered finger 32.

When the bowed frame 30 is flattened out when pressed against a swept surface, the cantilevered fingers 32 are biased by material resilience away from the frame 30 at the respective hinges 36; on the other hand, the cantilevered fingers 32 are forced toward frame 30 by contact with the swept surface at the flat rectangular ends 38. The openings 34 give the cantilevered fingers 32 sufficient clearance for movement in either direction. The openings 34 are also salutary for punching, blanking, or like manufacturing processes.

It is preferable that the innermost cantilevered fingers 32, appearing as the shorter fingers in FIGS. 6 and 7, be relatively rigid. They generally do not undergo the hinge or bending action. Nonetheless, even contact of the wiper blade to a swept surface is assured by conventional pivoting action between the mounting bracket and the wiper actuation arm. These relatively rigid cantilevered fingers 32 help prevent the actuation arm from bouncing during each pass over the swept surface, resulting in unwanted chatter. To be sure, the rigidity or stiffness of each cantilevered finger can be adjusted by conventional metalworking processes.

Figure 8:
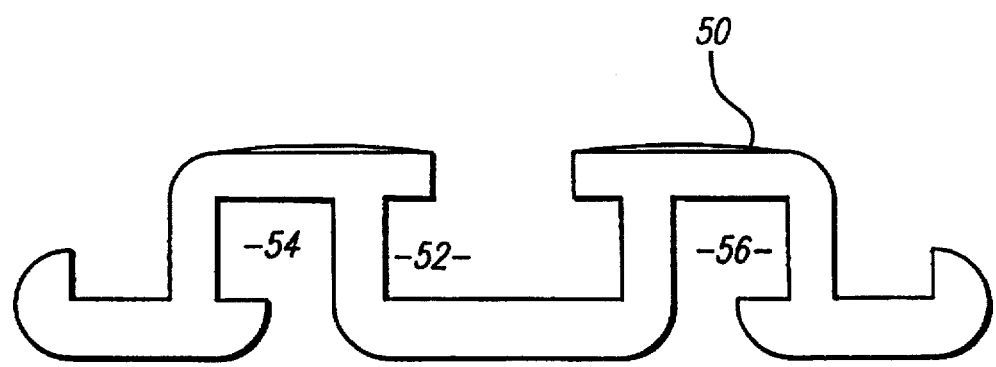
FIG. 8 is a cross-sectional view of a preferred embodiment spline.
Figure 9:
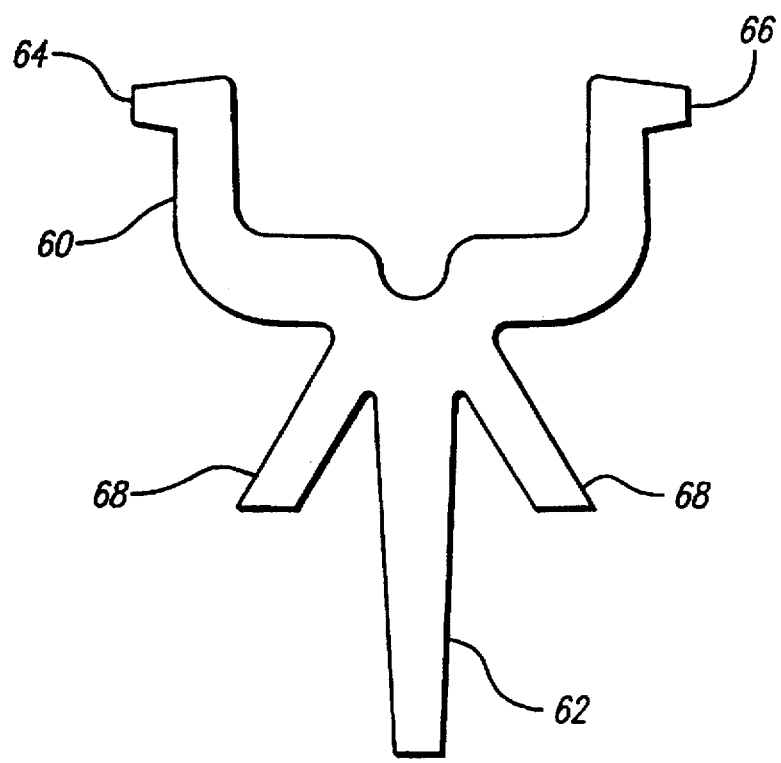
FIG. 9 is a cross-sectional view of a preferred embodiment wiper blade.

The present invention also contemplates a spline that facilitates attachment of the wiper blade to the flat spring frame. FIG. 8 is a cross-sectional view of a preferred embodiment spline and FIG. 9 is a cross-sectional view of a preferred embodiment wiper blade. The spline 50 shown in FIG. 8 generally has a long, strip shape that incorporates preferably three parallel slots or channels that extend along the length thereof. The center channel is preferably the frame attachment channel 52. Disposed on either side of the frame attachment channel 52 are inverted, L-shaped wiper blade attachment channels 54, 56.

In the present invention, the frame channel 52 and wiper blade channels 54, 56 are arranged so that they are all coextensive within the same thickness contained by two imaginary parallel planes. In this arrangement, the spline 50 is only single height with a very, very low profile. Naturally, there can be more Or fewer frame attachment and wiper blade attachment channels to accommodate multiple blades and multiple frame mounting points. The spline 50 is preferably made from any semi-rigid material known in the art.

FIG. 9 is a cross-sectional view of a preferred embodiment wiper blade 60 having a U-shaped top portion with a squeegee blade 62 extending downward. The wiper blade 60 preferably includes co-planer, dual outward-extending runners 64, 66, that span the length of the wiper blade 60. Each runner preferably has an L-shape cross-section, but a T-shape cross-section is suitable as are other cross-sectional shapes known in the art. Optional scrapers 68 extend downward on either side of the squeegee blade 62. Accordingly, the wiper blade 60 is adapted to fit into the spline 50 shown in FIG. 8, wherein the runners 64, 66 slide into corresponding L-shaped wiper blade attachment channels 54, 56. Once this assembly is accomplished, the spline 50 can be attached to the frames shown in FIGS. 1–3 or 6–7.

Importantly, the spline 50 shown in FIG. 8 features wiper blade attachment channels 54, 56 that are sufficiently large so that there is a clearance space between the runner and the interior of the channel when the wiper blade is installed. The clearance space allows the runners to rock up and down within channels 54, 56. The rocking action translates to improved lateral compliance of the wiper blade as it glides back and forth over the swept surface.

Figure 12:
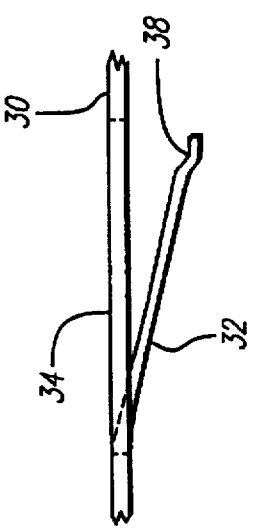
FIG. 12 is a partial side elevational view showing a cantilevered finger and an out-of-plane bend.

In FIGS. 6–7, each cantilevered finger 32 has a wide end, here drawn as a flat, rectangular end 38 bent out of plane from the plane defined by that cantilevered finger 32. FIG. 12 is a partial side elevational view of a cantilevered finger 32 illustrating the out-of-plane bend at the rectangular end 38. The rectangular end 38, of course, can be of any suitable shape including a circle, triangle, semi-circle, etc. The rectangular end 38 acts as a pressure and attachment point which slides into frame attachment channel 52. The out-of-plane bend at the rectangular end 38 facilitates assembly to the frame attachment channel 52. Preferably, after assembly, there is a clearance space between the rectangular end 38 and the frame attachment channel 52 to allow for rocking of the spline under frame 30.

Optional tabs 70 disposed within respective openings 72 at opposite ends of the frame 30 can be bent slightly to hook into the frame attachment channel 52 at the far ends of the spline 50, thereby holding the spline 50 to the frame 30. Bending the frame 30 backward allows insertion of the spline 50 onto tab 70; the present invention is thus a clipless system.

Through similar techniques or other techniques known in the art, the spline and wiper blade combination can be attached to the frame 10 shown in FIGS. 1–3. For example, small L-shape clips or hooks 26 formed along the length of the frame 10 latch on to a spline which can be slid thereon.

Figure 10:
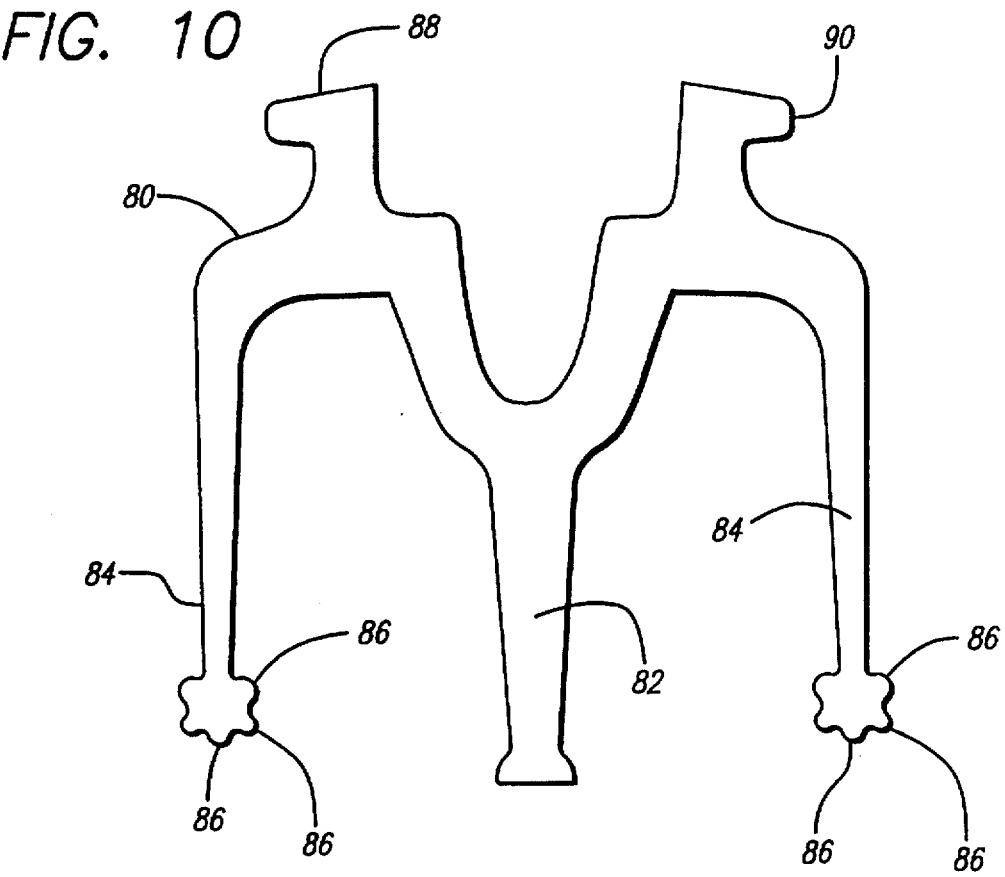
FIG. 10 is a cross-sectional view of an alternative embodiment wiper blade.

FIG. 10 is a cross-sectional view of an alternative embodiment wiper blade 80. The wiper blade 80 preferably has an M-shape cross-sectional shape with three downward extending legs. The central leg 82 performs the primary squeegee action while the two side legs 84 assist in the scraping or sweeping action. The side legs 84 optionally include small bumps 86 at their tips to prevent binding againet the windshield glass. Attachment of this alternative embodiment wiper blade 80 is accomplished through runners 88, 90 that slide into the wiper blade attachment channels 54, 56.

FIG. 4 provides a side elevational view of an alternative embodiment wiper having a flat spring wiper frame 102, which frame 102 includes a central, pivotable rocker arm 104 that pivots at a central hinge 106. The discrete contact points 100 on the arm 104 to which a spline is mounted produce a similar effect as the innermost cantilevered fingers 32 of the exemplary embodiment from FIGS. 1–3. Once a blade is attached to a spline such as that shown in FIG. 8, the spline and blade combination slide onto the frame 102 and attach at contact points 100 through any means known in the art.

In yet another alternative embodiment (not shown), a frame such as that shown in FIGS. 1 or 7 is made from two pieces joined at a bracket such as that shown in FIG. 1. This design easily incorporates many of the other features of the present invention.

Figure 11:
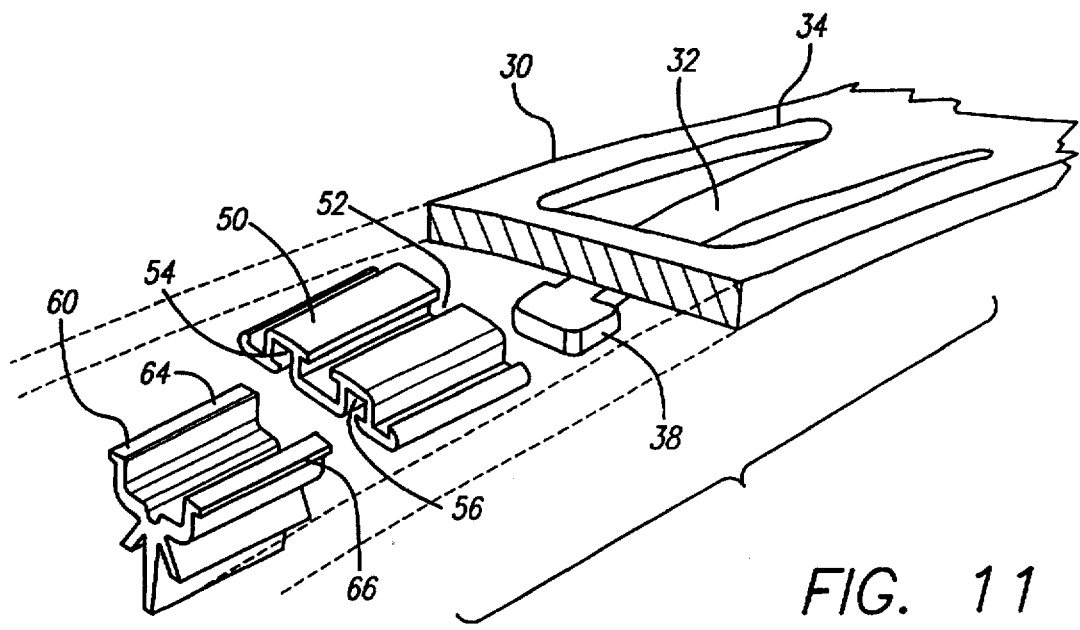
FIG. 11 is a perspective view of the wiper blade, spline and frame assembly.

FIG. 11 is a partial perspective view of the present invention assembly showing a wiper blade, a spline, and part of a preferred embodiment wiper frame. Specifically, FIG. 11 shows wiper blade 60 having dual runners 64, 66 that are aligned to slide into respective L-shaped wiper blade attachment channels 54, 56 of a spline 50. The spline 50 in turn has its frame attachment channel 52 aligned to slide onto flat rectangular end 38 of a cantilevered finger 32 disposed on the flat spring frame 30. A slight crease can be seen near the flat rectangular end 38 to render it out-of-plane with the cantilevered finger 32 to ease assembly. The frame 30 has been cut away to expose the spline 50 and blade 60.

What is claimed is:

1. A windshield wiper frame assembly for a windshield wiper comprising:

a substantially flat, elongated, resilient body having opposite ends, a middle portion therebetween, and a topside and an underside, wherein the middle portion includes resilient, preformed fingers having enlarged distal ends biased toward beneath the underside, and the body is bowed so that the underside defines an inside curve;

an elongated spline having a central slot with a reduced width opening extending along a length thereof with substantially L-shape slots on opposite sides of the central slot extending along the length, wherein the enlarged distal ends of the preformed fingers slide into the central slot so that the fingers are slidably received within the central slot and held laterally with respect thereto; and a wiper blade having a length corresponding to the length of the spline and a substantially U-shape transverse cross-section with outward extending lips that slide into the L-shape slots, and a scraper strip extending along the length at a bottom area of the U-shape cross-section.

2. The windshield wiper frame assembly according to claim 1, wherein the L-shape slots includes a clearance space so that the outward extending lips undergo a rocking motion therein when the wiper is in motion.

3. The windshield wiper frame assembly according to claim 1, wherein the middle portion of the wiper has a center and the preformed fingers extend toward the center.

4. The windshield wiper frame assembly according to claim 1, wherein the wiper frame assembly further comprises a sheet spring steel material.

5. The windshield wiper frame assembly according to claim 1, wherein the body further comprises preformed locking tabs located proximate to the opposite ends and extending toward beneath the underside.

6. The windshield wiper frame assembly according to claim 1, wherein the spline further comprises a semi-rigid material.

7. The windshield wiper frame assembly according to claim 1, wherein the central slot and the L-shape slots are substantially aligned in a transverse cross-section of the spline.

8. A windshield wiper frame assembly for a windshield wiper comprising:

a substantially flat, elongated, resilient body having opposite ends, a middle portion therebetween, and a topside and an underside, wherein the middle portion includes resilient, preformed fingers biased toward beneath the underside, and the body is bowed so that the underside defines an inside curve;

an elongated spline having a central slot with a reduced width opening extending along a length thereof with substantially L-shape slots on opposite sides of the central slot extending along the length, wherein the preformed fingers slide into the central slot so that the fingers are slidably received within the reduced width central slot and held laterally with respect thereto;

wherein each preformed finger further comprises an end with a first width defining a tab, and a reduced width narrow section adjacent said tab, and the narrow section is bent so that the tab is positioned downward from and substantially parallel to the preformed finger and the tab is disposed within the central slot; and a wiper blade having a length corresponding to the length of the spline and a substantially U-shape transverse cross-section with outward extending lips that slide into the L-shape slots, and a scraper strip extending along the length at a bottom area of the U-shape cross-section.

9. A windshield wiper frame assembly comprising:

a resilient, flat strip body having a topside and an underside side, the body including a curvature bending downward toward the underside;

resilient fingers each cantilevered from the body extending within a respective opening in the body, wherein each resilient finger is biased downward and includes an enlarged distal end;

an elongated spline having at least two co-planer wiper attachment channels and a frame attachment channel with a reduced width opening extending along a length of the spline, wherein the enlarged distal ends of the resilient fingers are slidably received within the frame attachment channel and held laterally with respect thereto; and a wiper blade having co-planer runners extending along a length thereof engaging the co-planer wiper attachment channels.

10. The windshield wiper frame assembly of claim 9, wherein the frame attachment channels are substantially aligned in a transverse cross-section of the spline.

11. The windshield wiper frame assembly of claim 9, wherein each of the co-planer wiper attachment channels further comprises a predetermined clearance space with each of the co-planer runners.

12. The windshield wiper frame assembly of claim 9, wherein the wiper blade further comprises an M-shape transverse cross-section.

13. The windshield wiper frame assembly of claim 9, wherein the wiper blade further comprises an M-shape transverse cross-section having a center leg disposed between two side legs, and each side leg includes bumps at a tip thereof.

14. The windshield wiper frame assembly of claim 9, wherein the body further comprises a thickness in the direction of said curvature, a corresponding width, opposite ends and a midpoint such that a width at the opposite ends is less than a width at the midpoint.

15. A windshield wiper frame assembly comprisinq:

a resilient, flat strip body having a topside and an underside side, the body including a curvature bending downward toward the underside;

resilient fingers each cantilevered from the body extending within a respective opening in the body, wherein each resilient finger is biased downward;

an elongated spline having at least two co-planer wiper attachment channels and a frame attachment channel extending along a length of the spline, wherein the resilient fingers are slidably received within the frame attachment channel and held laterally with respect thereto;

wherein each finger further comprises an end with a first width defining a tab, and a reduced width narrow section adjacent said tab, and the narrow section is bent so that the tab is positioned downward from and substantially parallel to the finger and the tab is disposed within the frame attachment channel; and a wiper blade having co-planer runners extending along a length thereof engaging the co-planer wiper attachment channels.

16. A windshield wiper frame assembly comprising:

a frame structure having integral cantilevered fingers formed along a length thereof;

an elongated spline having a length, a thickness, and a width greater than the thickness, the spline including first and second opposing faces defined by the length and the width;

a frame attachment channel extending the length of the spline, along a center of the width thereof, an opening in the first face exposing the frame attachment channel, the opening being reduced in width from the frame attachment channel to partially enclose the frame attachment channel at the first face;

two wiper attachment channels formed in the second face of the spline adjacent to and on opposite sides of the frame attachment channel, openings in the second face leading to the wiper attachment channels;

wherein the wiper attachment channels and frame attachment channel are substantially aligned in a cross section defined by the width and thickness of the spline;

a wiper blade having attachment runners extending along a length thereof; and wherein the runners of the wiper blade slidably engage the wiper attchment channnels, and the cantilevered fingers of the frame slidably engage the frame attachment channel.

* * * * *